United States Patent [19]

Gaske et al.

[11] Patent Number: 4,999,216
[45] Date of Patent: Mar. 12, 1991

[54] METHOD OF COATING CONCRETE FLOORS WITH PHOTOCURABLE COATINGS

[75] Inventors: Joseph Gaske, Mt. Prospect; John J. Krajewski, Wheeling; Gerry K. Noren, Hoffman Estates, all of Ill.

[73] Assignee: DeSoto, Inc., Des Plaines, Ill.

[21] Appl. No.: 396,853

[22] Filed: Aug. 21, 1989

[51] Int. Cl.⁵ .............................................. B05D 3/06
[52] U.S. Cl. ...................................... 427/44; 219/202; 427/54.1; 427/393.6; 428/522; 428/540
[58] Field of Search ................... 427/44, 54.1, 393.6; 219/202; 428/522, 540

[56] References Cited

U.S. PATENT DOCUMENTS 4,035,321 7/1977 Shahidi et al. .................. 525/529 X
4,042,476 8/1977 Collins et al. .................. 427/54.1 X

*Primary Examiner*—Michael Lusignan
*Attorney, Agent, or Firm*—Dressler, Goldsmith, Shore, Sutker & Milnamow, Ltd.

[57] ABSTRACT

A method of coating a concrete floor is disclosed in which the concrete surface is coated with a homogeneous liquid coating composition containing maleate or fumarate unsaturation in combination with vinyl ether unsaturation and a ketonic photoinitiator, the wet coating is allowed to seep into the concrete surface and to flow out on the concrete surface to form a smooth coating, and this coating is cured by exposing it at light having a wavelength in the range of from about 200 to about 600 nanometers.

19 Claims, 1 Drawing Sheet

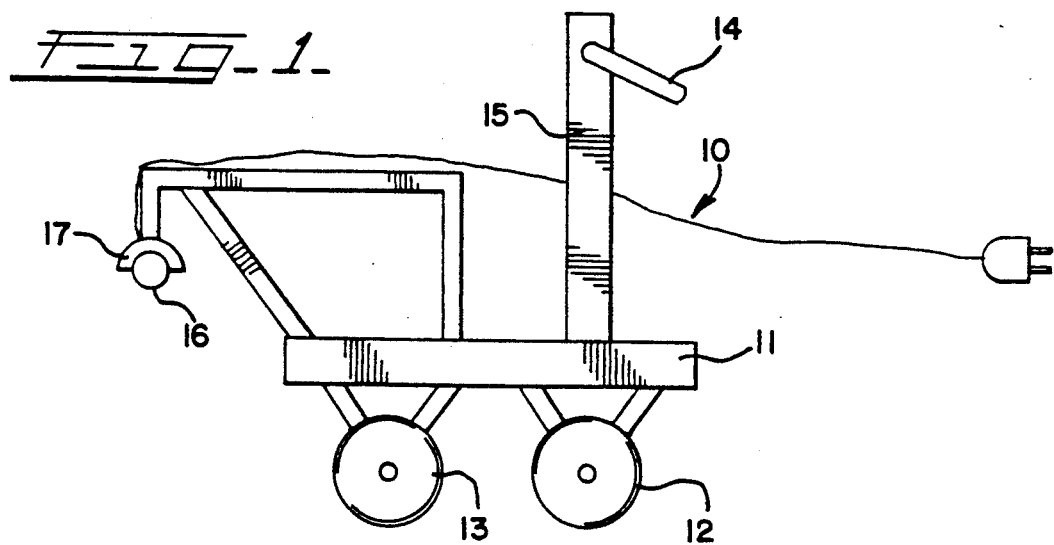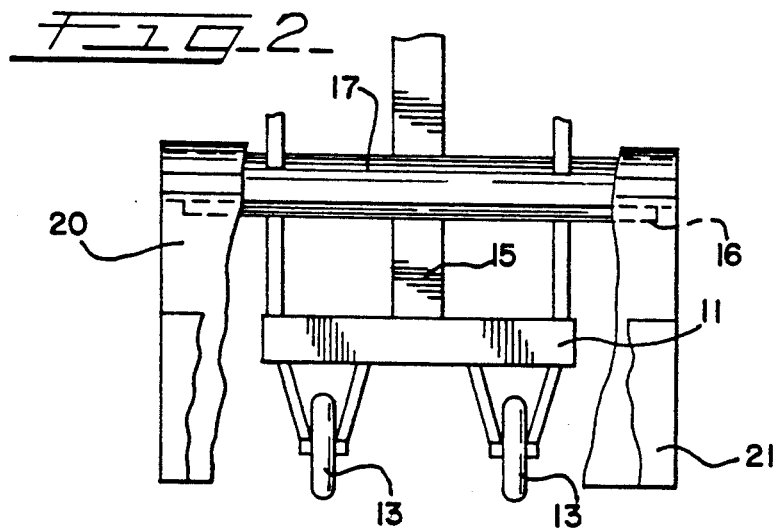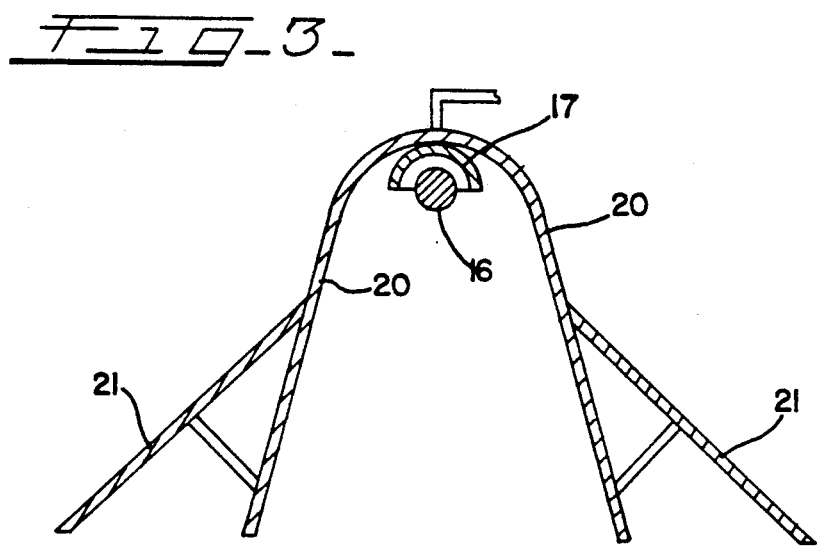

METHOD OF COATING CONCRETE FLOORS WITH PHOTOCURABLE COATINGS

DESCRIPTION

1. Technical Field

This invention relates to a method of coating concrete floors with a photocurable coating which is then cured by exposure to appropriate radiation to form a continuous floor coating. The invention includes apparatus which allows the coating to be cured to provide a continuous surface atop the concrete.

2. Background Art

It is known to coat concrete, but it takes several hours for the coatings to dry even when the coatings which are used cure at room temperature on exposure to air. While drying is taking place, dust can settle upon and adhere to the wet coating. Also, one cannot walk across the wet floor without marring it. Indeed, the drying time is usually about four to five hours even when using commercially available solvent-based coatings. It would be advantageous to employ a radiation-curable coating, but the conventional radiation-curable coatings introduce significant difficulties which are discussed below.

First, one must use a liquid composition which cures rapidly on exposure to some acceptable form of radiation, and this limits one to light, either in the ultraviolet range or somewhat above that range. Second, the only rapidly curing liquid compositions previously available were (meth)acrylate-based compositions. It is difficult to use compositions containing any significant proportion of (meth)acrylates in an exposed environment, as is encountered in the coating of floors. The (meth)acrylates tend to be toxic and odorous materials, and even the least toxic of these tend to irritate the skin. Some people are more sensitive than others and compositions used by the public must not injure those who are more sensitive. As a result, light-curable coatings for concrete floors have not been practical even though the concept of rapid cure by mere light exposure is obviously attractive as the basis for finishing and maintaining concrete floors.

One particular composition now in commerce involves the spray application of two coats. The first or base coat is a clear coating which is an aqueous two-component epoxy system. This base coat is intended to consolidate the surface of the concrete so that the topcoat will adhere and not delaminate. The topcoat, which is intended to resist wear and to provide desired decoration, is a pigmented coating which is a moisture-curing polyurethane coating.

As will be evident two coating are involved, and both of them require considerable time to cure (during which the floor cannot be used). Moreover, the second coating is a solvent-based coating, and the solvents used contribute pollution, hazard and can disturb the people who are nearby while the solvent is evaporating. A radiation-curable system wholly or largely eliminates the solvent as well as the drying time. While a single coating is particularly contemplated herein, two coat systems can be used in this invention and are intended to be included.

As a matter of interest, the possibility of using a cationic curing system is not available because a cationic cure cannot be carried out atop a concrete floor because of the basic nature of concrete.

Another problem in the use of radiation-curable coatings for the finishing of concrete floors is that if one strip of coating is applied and cured prior to application of the next strip, the result is a coating with parallel seams. It is desired to apply the liquid coating to the entire surface and then to cure that coating without marring it during the curing procedure. This requires apparatus not now available.

SUMMARY OF THE DISCLOSURE

In accordance with this invention, a concrete floor is coated with a liquid coating composition containing maleate or fumarate unsaturation in combination with vinyl ether unsaturation (preferably a combination of a polymaleate or a polyfumarate with a polyvinyl ether). The wet coating, on standing, quickly seeps into the concrete surface which enhances adhesion to the concrete. As the coating seeps into the concrete, it also flows out on the concrete surface to form a smooth coating. In this invention it is found that the coatings described above cure rapidly when exposed to light, bond strongly to the concrete when cured, and provide a reasonably abrasion-resistant film which can be walked upon.

The coating composition which is applied to the concrete includes photoinitiators, and certain of these provide a superior cure, as will be discussed. When the wet coating is then exposed to light of appropriate wavelength, as will also be discussed, it cures rapidly so that it becomes possible to cure the coating with a light source carried by a wheeled carrier. The result is a rapid cure from a system which is substantially 100% solids so that volatiles are substantially eliminated and the drying time is effectively eliminated.

The coatings of this invention are primarily intended for application to concrete floors, but they can also be applied to other concrete surfaces, such as walls, ceilings, and even preformed concrete slabs.

As a feature of this invention, a wheel-supported apparatus is employed with an appropriate light source extending forwardly of the wheels and pointing downwardly to direct the light energy upon the floor in advance of the wheels and in a lateral path wider than the tracks of the wheels. In this way when the device is moved forwardly, that portion of the floor in advance of the wheels is exposed to a curing dose of light and is cured and capable of supporting the wheels without being marred by the time the wheels reach that portion.

This wheeled device may include means positioned forwardly of the light to apply the coating. In this way the coating is applied, as by being sprayed upon the floor, and cured by exposure to light before the wheels reach it. In many instances it is preferred to coat the entire surface prior to cure, as by spraying or by roller application of the coating. In this way the applied coating has time to penetrate and flow out upon the concrete floor to which it has been applied.

Referring more particularly to the photopolymerizable liquids which are used herein, these are constituted by a homogeneous liquid composition which contains both vinyl ether groups and maleate or fumarate groups in the presence of a ketonic photoinitiator. This photoinitiator can be conventionally selected, such as by using benzophenone. However, in preferred practice a superior and more rapid cure is obtained using an hydroxy or alkoxy-functional acetophenone derivative, preferably an hydroxyalkyl phenine, or a benzoyl diaryl phosphine oxide, as photoinitiator.

These two different types of ethylenic unsaturations interact surprisingly well in the presence of a ketonic photoinitiator, and much more rapidly in the presence of the above-specified photoinitiators to provide a rapid photocure. This is a surprising and important finding and is the subject of an application by Gerry K. Noren, Ser. No. 319,566 filed Mar. 7, 1989.

The above described compositions are essentially nontoxic, they do not induce skin irritation, they have little odor, and they form adherent and wear-resistant coatings on concrete.

More particularly, and using ordinary aryl ketone photoinitiators, such as benzophenone, maleate and fumarate-functional materials respond poorly to photocure using, for example, ultraviolet light. Under these same conditions the vinyl ethers do not exhibit any substantial response to the ultraviolet exposure. Nonetheless, these two types of unsaturation in admixture respond well to the ketone-initiatead photocure, and the photocure is very rapid when the photoinitiator is selected in the described manner.

The photocure is especially rapid and effective when both of the described functionalities are provided in polyfunctional moieties, particularly those of resinous character. The fastest cures are obtained when the respective functionalities are present in about the same equivalent amount.

In the usual practice of this invention, the homogeneous liquid composition comprises a blend of a vinyl ether compound, preferably an oligomer containing a plurality of vinyl ether groups, and a maleic or fumaric-unsaturated ester, preferably a polyester containing a plurality of maleate or fumarate groups, and especially a resinous polyester which is of liquid character so as to minimize the need for diluents to reduce viscosity and thus enable coating application. The photoinitiator is usually added shortly prior to use, but this is not essential.

The term "liquid", and any other term used herein to describe the physical condition of anything, is used in its normal sense to denote the condition at room temperature (about 25 C). The vinyl ether compound and the maleic or fumaric-unsaturated ester are either liquids themselves or in admixture, or if the mixture is not sufficiently flowable for coating application, then other liquid components are added to provide the desired viscosity, as will be discussed.

DETAILED DESCRIPTION OF INVENTION

The vinyl ether compounds which may be used herein are subject to wide variation, vinyl ether monomers, like butyl vinyl ether and octyl vinyl ether being useful. These monomers are volatile, and it is preferred to use the higher molecular weight vinyl ethers which are less volatile. Indeed, and since volatiles are desirably minimized or eliminated, the vinyl ether compounds which are preferred are oligomeric and contain more than one vinyl ether group per molecule.

To illustrate polyvinyl ether oligomers, one may use the bisvinyl ether of triethylene glycol or of any other diol, such as 1,6-hexane diol or dibutylene glycol. One may also use polyvinylates of other polyhydric alcohols, such as glycerin or trimethylol propane. Polyhydric polyethers can be used, such as ethylene oxide, propylene oxide or butylene oxide adducts of polyhydric alcohols, illustrated by ethylene glycol, butylene glycol, glycerin, trimethylol propane or pentaerythritol. Polyvinyl ether polyurethanes of the type shown in U.S. Pat. No. 4,751,273 are also useful.

Liquid polyvinyl ethers are preferred for low viscosity, albeit ethylenic monomers, like n-butyl vinyl ether or monobutyl or dibutyl maleate or fumarate or volatile organic solvents may be used to reduce viscosity when this is desired. However, it is a feature of this invention that roller coating or even spray viscosity can be obtained using polyvinyl ethers and polymaleates or polyfumarates without the addition of volatile diluents.

The polyethylenic maleic or fumaric polyesters are preferably liquid hydroxy functional linear polyesters resins having an acid value of less than about 30.

The molecular weight of the polyester is determined by the ratio of hydroxyl to carboxyl groups. A ratio of about 2:1 or higher provides a low molecular weight while a ratio of about 1:1 provides high molecular weight. A ratio of diol to diacid in the range of from 1.1:1.0 to 1.5:1.0 is preferred.

Referring more particularly to the polyesters which can be used, the extent of the polyesterification reaction also influences molecular weight, the low acid value products used herein indicating relatively complete reaction. Maleic and fumaric acids are dicarboxylic (maleic anhydride is also useful), and they are usually reacted with a diol, such as ethylene glycol, propylene glycol, or other diol as illustrated herein, to provide the polyester. Polyols containing more than two hydroxy groups may be present in small amounts, such as up to about 25% of total hydroxy functionality of trimethylol propane to provide branching in the otherwise linear polyester. A portion of the diacid component of the polyester can be saturated, as by using phthalic acid or its anhydride, succinic acid or azelaic acid or the like. The use of saturated materials reduces the number of unsaturated groups per molecule which reduces the brittleness of the cured coating.

The lowest molecular weight materials are useful herein, albeit some of these are volatile and hard to use for that reason. Nonetheless, the difficulty of handling volatile materials does not prevent the rapid cure which is achieved herein. Similarly, higher molecular weight makes it more difficult to provide a homogeneous liquid composition, but the presence of monomeric unsaturated liquid diluents (and even volatile solvents in very small amounts) can extend the molecular weights of the components which can be combined in a homogeneous liquid composition. So long as the composition is a homogeneous liquid having a viscosity which allows it to be applied to the concrete floor, it can be used herein.

The blend of vinyl ether compound and maleic or fumaric-unsaturated polyester may vary considerably from a weight ratio of 5:95 to 95:5. However, it is preferred to employ a weight ratio of from 20:80 to 80:20. Best results are obtained using a weight ratio of from 35:65 to 65:35. As should be evident, an exact balance between the two types of unsaturated groups is not essential in this invention.

While useful results are obtained without a precise balance between the vinyl ether groups and the maleate or fumarate groups, the fastest and best cures are obtained when these two groups are present in about stoichiometric proportions. Thus, the cure speed falls off badly when the equivalent ratio of the two types of groups is outside the range of about 3:1 to about 1:3, preferably 2:1 to 1:2.

It is desired to point out that in the usual situation one blends a vinyl ether-functional material and a maleate or fumarate-functional material together into a homogeneous liquid composition to which is added, at any convenient time, the selected photoinitiator. However, these two separate functionalities may be present in the same oligomeric molecule.

To illustrate using the same molecule to support both types of unsaturations, one may provide the vinyl ether group in the compound hydroxybutyl vinyl ether. Maleic anhydride can be adducted with butyl alcohol to form monobutyl maleate which is then adducted with a molar proportion of propylene oxide to form 2-hydroxypropyl monobutyl maleate. One mole of hydroxybutyl vinyl ether and one mole of 2-hydroxypropyl monobutyl maleate can then be reacted with one mole of an organic diisocyanate, like isophorone diisocyanate. This reaction is preferably carried out in two stages so that all of one of the two unsaturated compounds bonds with the more reactive isocyanate group on the diisocyanate, and then the second unsaturated compound is added to react with the remaining isocyanate group. The result is a polyurethane formed in conventional manner using catalysts such as dibutyl tin dilaurate and temperatures of about 30 C in the first stage and 60 C in the second stage. This polyurethane contains vinyl ether groups and maleate groups in the same molecule, and these can be cured by appropriate light exposure in accordance with this invention.

The acetophenone derivatives which may be used have the formula:

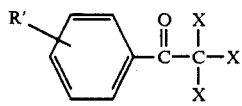

in which R' is an optional hydrocarbon substituent containing from 1 to 10 carbon atoms and which may be alkyl or aryl, e.g., methyl, ethyl, butyl, octyl or phenyl, X is selected from the group consisting of hydroxy, $C_1$-$C_4$ alkoxy, $C_1$-$C_8$ alkyl, cycloalkyl, halogen, and phenyl, or 2 Xs together are cycloalkyl, and at least one X is selected from hydroxy and $C_1$-$C_4$ alkoxy.

All sorts of compounds have the required structure. Thus, the alkoxy groups are preferably methoxy or ethoxy, the alkyl group is preferably methyl or ethyl, the cycloalkyl group is preferably cyclohexyl, and the halogen is preferably chlorine. Only a few of the useful compounds are available in commerce. Thus, one can use the Ciba-Geigy product Irgacure 651 which has the formula:

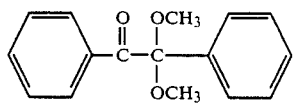

Irgacure 184 is another useful acetophenone derivative, and it has the formula:

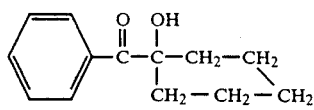

Still another commercially available useful acetophenone derivative is diethoxy acetophenone which has the formula:

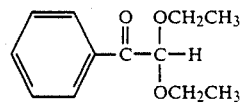

When the photoinitiator is an hydroxy-functional compound, one can define the useful acetophenone derivatives in a somewhat different manner. Thus, the hydroxyalkyl phenones which are preferred herein have the formula:

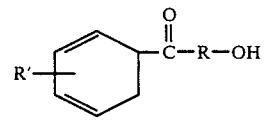

in which R is an alkylene group containing from 2-8 carbon atoms and R' is an optional hydrocarbon substituent containing from 1 to 10 carbon atoms and which may be alkyl or aryl, e.g., methyl, ethyl, butyl, octyl or phenyl.

It is particularly preferred that the hydroxy group be in the 2 position in which case it is preferably a tertiary hydroxy group which defines an hydroxy group carried by a carbon atom which has its remaining three valences connected to other carbon atoms. Particularly preferred compounds within which will be found the commercial material used to obtain the data discussed have the formula:

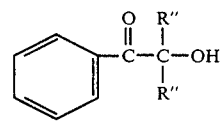

in which R'' is an alkyl group containing from 1 to 4 carbon atoms. In the commercial product Darocur 1173, each R'' is methyl. This provides a compound which can be described as 2-hydroxy, 2-methyl, 1-phenyl propane 1-one. The corresponding compound in the the term "propane" is replaced by butane or hexane, and these will further illustrate preferred compounds in this invention.

The benzoyl diaryl phosphine oxide photoinitiators which may be used herein have the structure:

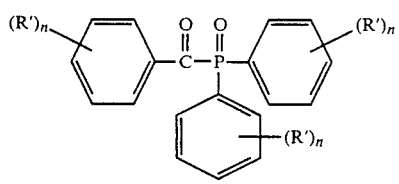

in the above formula, R' is an optional hydrocarbon substituent independently selected to contain from 1 to 10 carbon atoms, which may be alkyl or aryl, preferably an alkyl group containing from 1 to 4 carbon atoms, and n is an integer which is independently selected to be from 0 to 3.

In preferred practice, a 2,4,6-trimethyl benzoyl compound is used, and the two aromatic groups connected to the phosphorus atom are phenyl groups. This provides the compound 2,4,6-trimethyl benzoyl diphenyl phosphine oxide which is available from BASF under the trade designation Lucirin.

Vinyl ethers do not cure when exposed to ultraviolet light in the presence of ordinary ketonic photoinitiators, such as benzophenone. Maleate- or fumarate-unsaturated polyesters cure slowly and unsatisfactorily when exposed to ultraviolet light in the presence of ketonic photoinitiators, such as benzophenone. However, a mixture of these two components can be cured by ultraviolet light exposure in the presence of a conventional ketonic photinitiator, such as benzophenone. While the cure of such mixtures is still slow, it is much faster than one might suspect from the actions of the two separate components. Thus, any ketonic photoinitiator can be used by having a more powerful light source or by slowing the motion of the curing device.

When the ketonic photoinitiator is selected in the manner described herein, then the cure of the mixture is quite rapid and useful. A rapid photocure is important if the coating and curing device of this invention is to be moved around the wet-coated floor to be cured with desired speed. In preferred practice this speed is intended to provide a full cure when the curing apparatus is rolled across the floor at a comfortable walking pace.

While the compositions of this invention are useful when the named components are the only ones present, other saturated and unsaturated materials may also be present, especially saturated and unsaturated resins of various type, such as linoleic acid-modified saturated polyesters, polyacrylates, such as copolymers of methyl methacrylate containing about 10% of copolymerized dimethyl aminoethyl methacrylate, polyvinyl chloride, and the like. It is preferred not to have acrylate-functional materials present, for these introduce toxicity problems which are largely avoided by this invention.

Lastly, small amounts of agents of various types, such as wetting agents, flow control agents and the like, can be included for special purpose. The addition of such agents is optional.

A composition is formulated to contain 20 parts by weight of a bisvinyl ether of triethylene glycol, 22.8 parts by weight of a polyester made by reacting 1.5 moles of maleic anhydride with 1.8 moles of 1,5-pentane diol to an acid value of 10, at which point the unsaturated polyester is a viscous liquid at room temperature. The bisvinyl ether reduces the viscosity of the mixture to where it can be applied by coating apparatus, as for example by roller. By adding 5 more parts of the bisvinyl ether, the viscosity of the mixture is reduced to permit application by spray.

The ratio of vinyl ether groups to maleate groups in the composition of roller coating viscosity is about 1:1. About 4.0% of a photoinitiator is added to this composition. It is noted that all parts and proportions herein are by weight, unless otherwise specified.

2-hydroxypropyl phenone in which the hydroxy group is a tertiary hydroxy group is a known photoinitiator available under the trade designation Darocur 1173 from the E-M Company, Hawthorne, NY). When this photoinitiator is used in an amount of 4% based on the weight of the composition to cure the described composition, a full cure is obtained at a 1 Joule per square centimeter exposure level. The cured film is clear and continuous and possesses significant resistance to methyl ethyl ketone solvent. This represents a rapid cure to obtain a useful cured film, and is quite surprising. The coating adheres to concrete and has a pencil hardness in the range of from F to H.

Replacing 2-hydroxypropyl phenone with an equal weight of 2,4,6-trimethyl benzoyl diphenyl phosphine oxide, similar outstanding results are obtained.

In contrast, and using 4% of Darocur 1173 to try to cure the triethylene glycol divinyl ether by itself, no cure is obtained using up to 3 Joules of ultraviolet exposure. Using 4% of Darocur 1173 to try to cure the maleate polyester, the film is tacky until 3 Joules of ultraviolet exposure had been applied.

The light used for cure in this invention can have a wavelength anywhere in the ultraviolet range, including visible light close to that range. This broadly identifies wavelengths which are shorter than 600 nanometers, preferably from 200 to 400 nanometers (usually 200–350 nanometers).

Monomeric components which are appropriately unsaturated provide one way to reduce any excessive viscosity which may be present. These are illustrated by vinyl ethers, such as ethyl vinyl ether, propyl vinyl ether and butyl vinyl ether, but other less volatile materials are preferred, like octyl vinyl ether or butylene glycol divinyl ether. Similarly, one can have present simple maleates and fumarates, such as a $C_1$–$C_{18}$ ester of maleic or fumaric acid, such as monobutyl maleate or monooctyl fumarate. Simple dimaleates, such as glycerin dimaleate or butane diol dimaleate may also be present. One may also employ up to about 10% of allylic monomers or oligomers containing the same, like diallyl succinate or diallyl adipate. Even styrene or vinyl toluene may be present to reduce viscosity. Regardless of the presence of these additional components, the combinations of unsaturated materials specified herein respond to the photocure with exceptional speed, and this is especially true when the preferred photoinitiators are employed.

When the polyvinyl ether and the polyester possess excessive viscosity, one can employ up to 40%, preferably from 5% to 25%, of the above-described liquid monomers based on the weight of the composition, but these are not essential and are not used in the example.

It is preferred, as illustrated, to employ a homogeneous liquid mixture of a polyvinyl ether and a linear polyester having a plurality of maleate or fumarate groups. These polyesters are preferably formed by polyesterifying maleic acid or anhydridge or fumaric acid with a dihydric alcohol containing from 2–8 carbon atoms to an acid number of less than 30. Such liquid mixtures can be sold without the photoinitiator which is added by the user prior to coating application and exposure to light of appropriate wavelength, e.g., ultraviolet light.

Some further tests were carried out using the polyvinyl ether-maleic polyester mixture described previously, but using 3% of photoinitiator. A full cure to 100 MEK double rub resistance is obtained using Darocur 1173 on an exposure of only 0.5 Joules per sq. cm. Using Iragcure 651, Irgacure 184 and diethoxy acetophenone, the stated full cure required twice the exposure (1 Joule per sq. cm). In two of these instances, some slight rub off was observed, so the cure is slightly inadequate. Other photoinitiators are less satisfactory, illustrated by benzophenone which cures to less than 100 MEK double rub resistance using 2 Joules per sq. cm. This is a broadly satisfactory cure, but not as good or as rapid as is preferred.

Changing proportions to 2:1, the results are almost as good regardless of which of the two components is in excess. Some inadequacies in the cure show up using proportions of 3:1, and the cure performance degrades further when the equivalent proportions are further out of balance.

A wheeled vehicle carrying a forwardly extending light is used to expose the wet coating to enable its rapid cure. It is primarily contemplated that the vehicle would be pushed from the rear by an operator, but it could be motorized with the operator driving the vehicle in the manner of a lawnmower. In this way the maximum speed of the vehicle is approximately that of a person walking.

The light which extends forwardly of the vehicle must provide a path which extends laterally beyond the path of the wheels on the advancing vehicle. This laterally extending path of light exposure must also be relatively uniform from side to side so that all of the floor surface passing beneath it is approximately equally exposed.

Sill further, the light intensity should be such that when the vehicle is advanced at the pace of a person walking, there is delivered from 0.2 to 3.0, preferably from 0.5 to 1.5 Joules per square centimeter. The wavelength of the light should be in the ultraviolet or somewhat longer into the visible range as previously set forth. The wavelength which is appropriate can be expanded using dyes and other expedients, as is known, and the particular wavelengths which are employed must be selected to conform with the cure characteristics of the system under consideration.

Lastly, the wheeled apparatus under consideration is quite different from the normal use of lights on wheeled vehicles which are solely intended to illuminate the terrain in advance of the vehicle. In this instance, the wavelengths and light intensity are such that the light should be shielded by means of an opaque cover which surrounds the light source or sources used and which extends to just above the floor to be coated. This shield should also be surrounded by skirts to minimize reflected light.

The operator of the vehicle will normally wear protective glasses, but persons nearby are adequately protected by the shield and skirts.

An appropriate wheeled vehicle for use in the present invention is shown in the drawings in which:

FIG. 1 is a diagramatic side elevation of a wheeled vehicle showing the position of the light exposure means in front of the wheels. The shield which is normally present has been removed to reveal the light source.

FIG. 2 is a diagramatic front view showing the light exposure means extending laterally of the wheels on both sides. This time the shield has been partially removed to reveal the lateral extension of the light source.

FIG. 3 shows the light exposure means in cross-section so that one can see the manner in which the shield and skirt prevents the intense light source from injuring the eyes of those working with the wheeled vehicle or coming near the same while it is in use.

Referring more particularly to FIG. 1, the wheeled vehicle 10 comprises a platform 11 which is mounted above rear wheels 12 which swivel and front wheels 13 which do not swivel so that the vehicle will track when pushed forwardly by a person pushing upon the handle bars 14 carried by the upstanding support 15. In this way the platform 11 can be moved forwardly in a straight line while the person pushing it can steer the vehicle (which is in the nature of a dolly). The platform 11 carries forwardly extending supports which carry a forwardly extending light source 16 within a reflector 17 which directs the light which is emitted downwardly onto the floor in advance of the platform.

As can be seen in FIG. 2, the light source 16 and the reflector 17 extend laterally for a distance greater than the spacing of the wheels so that as the platform is pushed forward, the wheels reach a portion of the floor which has already been exposed to the light. Since the previously applied coating is a rapidly curing liquid, that coating is a solid load-bearing film by the time the wheels reach it.

As can be seen in FIGS. 2 and 3, the light source 16 is shown as being provided by a fluorescent tube which extends laterally across the front of the platform 11 so as to cause the floor beneath the light source to be uniformly exposed as the platform is moved forward across the floor.

The light source provides a very intense light, the energy therefore being supplied by the electric cord 18. Battery operation is also contemplated, but not shown. The intensity of the light source has been described previously, but it may be provided by a single bulb or several bulbs, and these may be elongated tubes or conventional bulbs so long as they provide a laterally uniform light source.

The reflector focuses the emitted light onto the floor, and this light being in or near the ultraviolet range and having great intensity is injurious to the eyes. Accordingly, a shield 20 is used which extends close to the floor without touching it, and this shield carries skirts 21 which prevent one who is looking toward the light source from seeing light reflected from the floor. In this way the operator and those nearby are protected from the possibly damaging light which is used. The operation of the shield and the skirts will be evident from FIG. 3.

What is claimed is:

1. A method of coating a concrete floor comprising coating said floor with a homogeneous liquid coating composition comprising a vinyl ether monomer, oligomer or polymer; a polyethylenic maleic or fumaric polyester and a ketonic photoinitiator, allowing the wet coating to seep into the concrete surface and to flow out on the concrete surface to form a smooth coating, and curing said coating by exposing the same to light having a wavelength in the range of from about 200 to about 600 nanometers.

2. A method of coating a concrete floor as recited in claim 1 in which said liquid coating composition contains an hydroxy or alkoxy-functional acetophenone derivative or a benzoyl diaryl phosphine oxide as photoinitiator.

3. A method of coating a concrete floor as recited in claim 1 in which said concrete floor has its entire surface coated with said liquid coating before said coating is exposed to a said light.

4. A method of coating a concrete floor as recited in claim 1 in which said light source is carried in front of wheeled carrier.

5. A method of coating a concrete floor as recited in claim 4 in which said light source extends forwardly of the wheels and points downwardly to direct the light energy upon the floor in advance of the wheels and in a lateral path wider than the spacing between the wheels.

6. A method of coating a concrete floor as recited in claim 1 in which said liquid coating composition contains a combination of a polymaleate or a polyfumarate with a polyvinyl ether 7. A method of coating a concrete floor as recited in claim 6 in which said composition comprises a blend of a polyvinyl ether oligomer and a maleic or fumaric-unsaturated polyester.

8. A method of coating a concrete floor as recited in claim 7 in which said polyvinyl ether oligomer and said unsaturated polyester are present in a weight ratio of 5:95 to 95:5.

9. A method of coating a concrete floor as recited in claim 8 in which said unsaturated polyester is an hydroxy-functional liquid resin having an acid value of less than 30 and said polyvinyl ether oligomer and said unsaturated polyester are present in a weight ratio of from 20:80 to 80:20.

10. A method of coating a concrete floor as recited in claim 9 in which said polyester is a maleic acid, maleic anhydride or fumaric acid polyester with a dihydric alcohol containing from 2-8 carbon atoms in a ratio of hydroxy groups to carboxyl groups of from 1.1:1.0 to 1.5:10 and having an acid number of less than 30.

11. A method of coating a concrete floor as recited in claim 1 in which the equivalent ratio of the vinyl ether and maleate or fumarate groups is in the range of about 3:1 to about 1:3.

12. A method of coating a concrete floor as recited in claim 11 in which said photoinitiator has the formula:

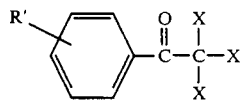

in which R' is an optional hydrocarbon substituent containing from 1 to 10 carbon atoms, and X is selected from the group consisting of hydroxy, $C_1$-$C_4$ alkoxy, $C_1$-$C_8$ alkyl, cycloalkyl, halogen, and phenyl, or 2 Xs together are cycloalkyl, at least one X being selected from hydroxy and $C_1$-$C_4$ alkoxy.

13. A method of coating a concrete floor as recited in claim 1 in which said photoinitiator has the formula:

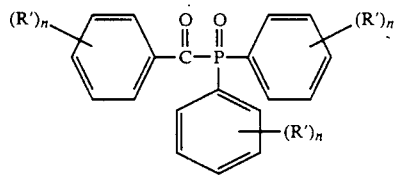

in which R' is an optional hydrocarbon substituent independently selected to contain from 1 to 10 carbon atoms and n is independently selected to be from 0 to 3.

14. A method of coating a concrete floor comprising coating said floor with a homogeneous liquid coating composition comprises a blend of a polyvinyl ether oligomer and a maleic or fumaric-unsaturated polyester, the equivalent ratio of the vinyl ether and maleate or fumarate groups being in the range of about 3:1 to about 1:3, and an hydroxy or alkoxy-functional acetophenone derivative or a benzoyl diaryl phosphine oxide as photoinitiator, allowing the wet coating to seep into the concrete surface and to flow out on the concrete surface to form a smooth coating, and curing said coating by exposing the same to light in the range of from about 200 to about 600 nanometers.

15. A method of coating concrete floor as recited in claim 14 in which said photoinitiator has the formula:

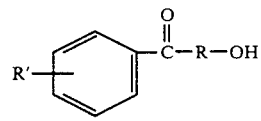

in which R is an alkylene group containing from 2-8 carbon atoms and R' is an optional hydrocarbon substituent containing from 1 to 10 carbon atoms.

16. A method of coating concrete floors as recited in claim 15 in which the hydroxy group in said formula is in the 2 position with respect to the carbonyl group in said formula.

17. A method of coating concrete floors as recited in claim 16 in which the hydroxy group in said formula is a tertiary hydroxy group.

18. A method of coating concrete floors as recited in claim 14 in which said photoinitiator is the compound 2,4,6-trimethyl benzoyl diphenyl phosphine oxide.

19. Concrete coated with a photocured homogeneous liquid coating composition containing maleate or fumarate unsaturation in combination with vinyl ether unsaturation and a ketonic photoinitiator.

* * * * *